Dec. 27, 1966 M. G. HANDLEY 3,293,978
SCREW WITH V-SHAPED SLOT
Filed Dec. 21, 1964
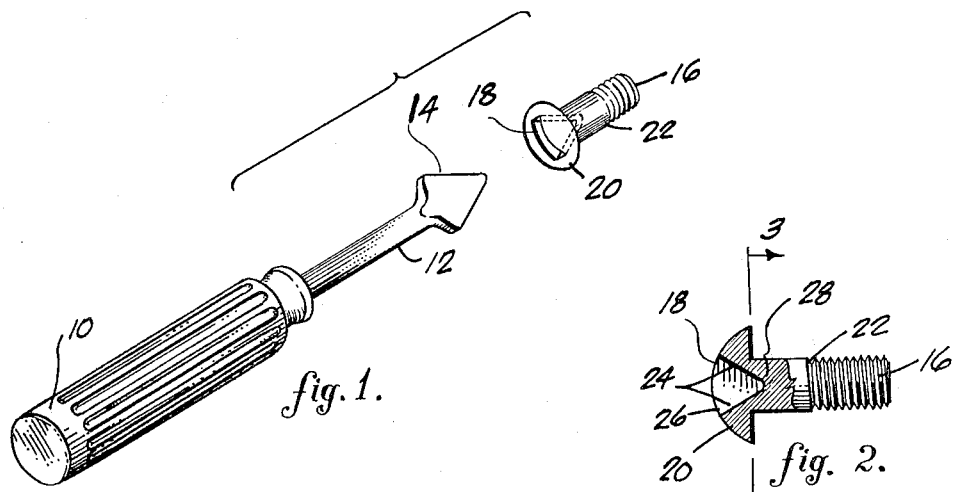
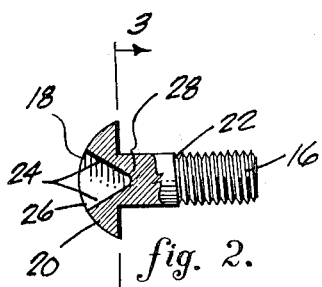
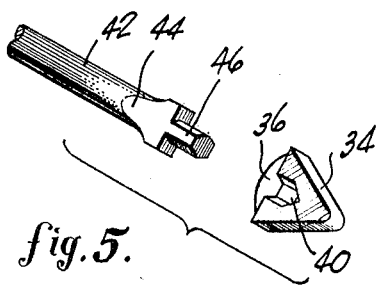
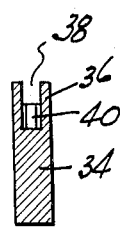
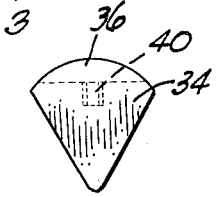
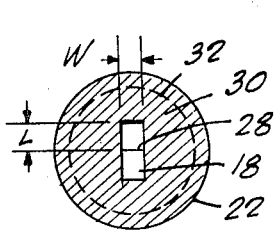
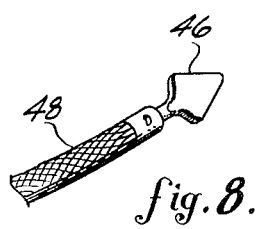
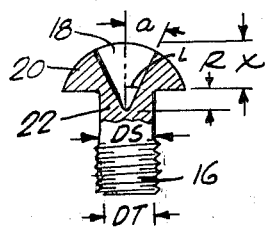
Inventor
MAX G. HANDLEY
by Robert O. Richardson
Attorney

United States Patent Office 3,293,978
Patented Dec. 27, 1966

3,293,978
SCREW WITH V-SHAPED SLOT
Max G. Handley, 38645 Frontier Ave.,
Palmdale, Calif. 93550
Filed Dec. 21, 1964, Ser. No. 411,453
4 Claims. (Cl. 85—45)

The present invention relates to V-slot screws and screwdrivers and more particularly to screws with slots extending into the shank thereof and associated driver means having parallel sides with tapered edges to engage said screws with maximum torque transmission efficiency.

In the types of screws and screwdrivers heretofore commonly employed, the screw has a transverse slot formed diametrically from side to side through the top of the head, with the driver having a transverse straight edge for engagement with the slot. Another form of screw slot has an axial recess with tapered walls which meet on the longitudinal centerline of the screw. Associated drivers have axial wings or flutes formed to engage the recess. These slots often have tapered sides and thus require a longitudinal force as well as a torquing force to prevent accidental withdrawal of the driver from the slot recess. Slippage of the driver within the recess renders the applied torquing force ineffective and frequently mars the workpiece and slotted head. As is well known, screws with damaged slotted heads are difficult to remove. If a screw head has been sheared, special techniques with additional tools are necessary to remove the damaged screw.

The V-slot screw and associated screwdriver comprising the present invention provides for a spear-shaped driver tang and screw recess having parallel sides and tapered ends. The screw recess extends through the head and into the shank below the head to shank juncture by a length approximately equal to half the shank diameter. The angle of the slot preferably is within a 50° to 60° range. Preferably the tapered edge walls of the tang and recess form into a rounded terminus which is tangent to a circle having a center on the longitudinal axis of the screw shank and driver tang.

It is therefore an object of this invention to provide for a new and improved screw.

Another object is the provision of a screw having a high torque load transmission to the screw shank.

Another object is the provision of a self-centering screw head for even torque distribution about the axis of the screw shank.

Another object is the provision of a screw with a V-slot in the head thereof whereby the structural integrity of the screw head is maintained by a closed circle of metal about its periphery for hoop strength, yet the recessed slot extends below the head to shank juncture.

Another object is the provision of a V-slot screw that may be used in one-handed operation.

Another object is the provision of a screw having a torque transmission slot extending into the screw shank.

Other objects will become apparent as a description of a preferred embodiment proceeds, having reference to the drawing wherein:

FIGURE 1 is a perspective view of the screw and screwdriver combination,

FIGURE 2 is an elevational view of a screw with a portion broken away to more clearly show the V-slot, FIGURE 3 is a sectional view taken along line 3—3 in FIGURE 2, FIGURE 4 is a perspective view with parts broken away and illustrating the relative dimensions useful in explaining certain critical values.

FIGURE 5 is a partial view in perspective showing a detachable tang, in cross-section, for the screwdriver, FIGURE 6 is a vertical sectional view of a detachable tang, FIGURE 7 is an elevational view of a detachable tang, and FIGURE 8 is a perspective view of an alternate form of driver.

Reference is now made to FIGURE 1 wherein there is shown a screwdriver having a handle 10, shank 12 and tang 14. This tang 14 is wedge or V-shaped in appearance although the sides of the tang are substantially parallel. The associated screw 16 has a corresponding V-shaped slot 18 in its head 20 and shank 22. The end walls 24 of the slot 18 are tapered while the side walls 26 are parallel. Preferably the tapering walls 24 of the slot 18 and the tapering ends of tang 14 on the driver form into a rounded terminus 28 which is tangent to a circle having a center on the longitudinal axis of the screw shank and driver tang. Such curved formation improves the forming tool life, relieves stress concentration in forming, and facilitates slot cleaning when necessary.

The union of the driver and slot recess effects a wedging engagement when joined together in operational relation. This is highly advantageous in enviromental conditions of reduced gravitational forces. It also has an advantage of making the screw self-supporting on the driver in horizontal or vertical planes, eliminating the necessity of screw guidance and stabilization during its driver along the longitudinal axis of the screw. These advantages become very useful especially in system complexes wherein vertical clearance is very restrictive and necessitates the use of offset drivers to effect screw advancement.

Referring now to FIGURE 2 there is shown a round headed machine screw 16 with the recess 18 having its innermost end 28 extending below the head to shank juncture so that in the event the head 20 should fail or be sheared off, the screw body or shank 22 may still be removed. While the screw illustrated is a round headed machine screw, the invention is also applicable to flat-headed screws, fillister screws, headless screws, wood screws, bolts and the like. In the case of flathead screws, the head to shank juncture is the point where the head diameter commences to increase. The slot extends below this juncture in accordance with the present invention.

An obvious criticism of extending the slot recess below the head to shank junction is that the removal of metal at the junction tends to weaken it and cause the head to shear off under excessive torquing force from a screwdriver. However, in accordance with the present invention this tensile strength at the junction is kept higher than that of the shank as will hereinafter be explained. Moreover, with the recess 18 extending below the juncture, torquing forces are applied below this juncture, permitting forces greater than the shear strength at the junction to be applied.

The head to shank tensile strength of screw 16 is a function of the cross-sectional area at the head to shank juncture. This is shown in FIGURE 3 as the cross-sectional area of the shank 22. The shank tensile strength is a function of the cross-section area of the shank defined by the thread relief diameter or the innermost thread diameter, whichever is the smaller. This area is shown in FIGURE 3 as being that area 30 within dashed line 32. The cross-sectional area of the slot 18 at the head to shank juncture must not diminish the juncture area 22 to less than that of shank area 30. By arbitrarily selecting a slot width W, the maximum slot length at the juncture can then be computed. When this slot length is known, the depth of the slot into the shank can then be computed for selected slot angles within the recommended 50° to 60° range.

Reference is now had to FIGURE 4 in determining a selected slot size and maximum depth for a given screw. A #4 screw has a diameter of .112 (cross-sectional area of .00985 sq. in.) and a UNC tensile stress area of .00604. This permits a maximum slot cross-sectional area at the jucture of $.00985 - .00604 = .00381$ in order for the junction to retain strength equal or greater than the shaft strength. Thus $W \times 2L = .0381$ sq. inch. If $W = .062$ (an arbitrary assigned width), then $$L = .00381/2 \times .062 = .03 \text{ inch}$$

If the slot angle is chosen to be 30°, then angle $a$ is 15°. $R = L/\tan a = .03/.268 = .1$. If a wider angle of $a = 30°$ were selected, with the width W remaining the same, then $R = .03/.577 = .052$ inch. If W were selected to be .04 and $a = 30°$, then $L = .003/.080 = .0375$ and $$R = .0375/.577 = .065 \text{ inch}$$

With W remaining the same and $a = 15°$, then $$R = .0375/.268 = .140 \text{ inch}$$

Thus it may be seen that the maximum slot depth into the shaft varies with the slot angle and slot width in order to keep the slot cross-sectional area at the head to shaft junction from exceeding the difference between the junction cross-sectional area and the smallest shaft area (thread relief area or thread root area, whichever is smaller).

Reference is now had to FIGURES 5, 6 and 7 wherein is shown a screwdriver adapter 34 for converting an Allen wrench or ordinary screwdriver for use. This adapter consists of a screw slotted-head fitting tang of tapered ends and parallel sides similar to that discussed in connection with FIGURE 1. This tang has a pair of upstanding ears 36 to form a slot 38 within which a flat screwdriver blade may be inserted to effect screw rotation. Between the ears and extending into the body of the tang is a hexagonal recess 40 within which an Allen wrench may be inserted for rotation of a screw. In FIGURE 5 there is shown a combination tool 42 having flat sides 44 adapted to fit within the tang ears 36, with an Allen hexagonal extension 46 adapted to fit within recess 40.

The embodiment shown in FIGURE 8 is that of a V-shaped tang 46 fitted to a flexible drive tool shank 48 for use in restricted areas.

While the foregoing embodiments are illustrative of the present invention, it will be apparent to those skilled in the art to which it relates that other embodiments may be made and practiced without departing from the spirit and scope of the invention as defined by the appended claims.

What is claimed is:
1. A screw having a head and a threaded shank:
said head and shank having a cavity therein,
the width of said cavity being within a range that will limit the area of the cavity at the juncture of the head and shank to no more than the difference in areas of the shank based on the diameters of the crest of the threads and the root of the threads,
said cavity comprising a V-shaped recess,
said cavity having essentially parallel sides with non-parallel edges,
said edges converging toward the bottom of said cavity,
said cavity having a depth of penetration into said shank approximately equal to one half the diameter of said shank,
said non-parallel edges forming an angle between 50° and 60°.

2. A screw having a head and a threaded shank:
said head and shank having a cavity therein,
the width of said cavity being within a range that will limit the area of the cavity at the juncture of the head and shank to no more than the difference in areas of the shank based on the diameters of the crest of the threads and the root of the threads,
said cavity comprising a V-shaped recess,
said cavity having essentially parallel sides with non-parallel edges,
said edges converging toward the bottom of said cavity,
said cavity having a depth of penetration into said shank approximately equal to one half the diameter of said shank.

3. A screw having a head and a threaded shank:
said head and shank having a recess therein,
the width of said recess being within a range that will limit the area of the recess at the juncture of the head and shank to no more than the difference in the area of the threaded shank based upon the diameters of the crest of the threads and the root of the threads,
said shank having a predetermined tensile strength,
the juncture of said head and shank having a greater tensile strength,
said recess at the plane of said juncture having a cross-sectional area less than that required to reduce the tensile strength of said juncture to less than that of said shank.

4. A screw having a head, a threaded shank and an interconnecting head-to-shank juncture:
a V-shaped slot in the head of said screw, said slot penetrating into said shank below said head-to-shank juncture,
said V-shaped slot having a width within a range that will limit the area of the V-shaped slot at the juncture area of the head and shank to no more than the difference in areas of the shank based on the diameters of the crest of the threads and the root of the threads,
said juncture area comprising its cross-sectional area minus the area of the said slot at the plane of said juncture,
said juncture area being greater than the cross-sectional area of said shank.

References Cited by the Examiner

UNITED STATES PATENTS

| | | | |
|---|---|---|---|
| 145,411 | 12/1873 | Frearson | 85—45 |
| 386,092 | 7/1888 | Rogers | 85—45 |
| 2,046,343 | 7/1936 | Phillips | 85—45 |

FOREIGN PATENTS

| | | |
|---|---|---|
| 17,351 | 9/1934 | Australia. |

WILLIAM FELDMAN, *Primary Examiner.*

MILTON S. MEHR, *Examiner.*

R. V. PARKER, Jr., *Assistant Examiner.*